United States Patent
Raneri

(10) Patent No.: US 12,204,301 B2
(45) Date of Patent: *Jan. 21, 2025

(54) ENERGY SAVINGS SELECTOR TOOL

(71) Applicant: Lutron Technology Company LLC, Coopersburg, PA (US)

(72) Inventor: Daniel Curtis Raneri, Orefield, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/133,112

(22) Filed: Apr. 11, 2023

(65) Prior Publication Data

US 2023/0244194 A1 Aug. 3, 2023

Related U.S. Application Data

(63) Continuation of application No. 16/410,032, filed on May 13, 2019, now Pat. No. 11,650,554, which is a (Continued)

(51) Int. Cl.
*G06Q 40/00* (2023.01)
*G05B 15/02* (2006.01)
(Continued)

(52) U.S. Cl.
CPC .......... *G05B 15/02* (2013.01); *G06Q 40/00* (2013.01); *G06Q 50/06* (2013.01); *H04L 67/125* (2013.01);
(Continued)

(58) Field of Classification Search
CPC ........ G06Q 40/00; G06Q 50/06; G05B 15/02
See application file for complete search history.

(56) References Cited

U.S. PATENT DOCUMENTS 4,930,562 A 6/1990 Goodman et al.
5,503,209 A 4/1996 Healzer et al.
(Continued)

FOREIGN PATENT DOCUMENTS

JP 2014044457 A * 3/2014 ............ G01D 4/004

OTHER PUBLICATIONS

Model-based estimation of energy savings in load control events for thermostatically controlled loads C Perfumo, JH Braslavsky . . .—IEEE Transactions on . . . , 2014—ieeexplore.ieee.org (Year: 2014).*

(Continued)

*Primary Examiner* — Lalita M Hamilton
(74) *Attorney, Agent, or Firm* — Condo Roccia Koptiw LLP

(57) ABSTRACT

An energy savings selector tool may assist a user in determining electrical devices that, when implemented in a load control system, may reduce an amount of power used by the load control system. The energy savings selector tool may use load control information of the load control system to identify electrical devices that may be added to or replace other electrical devices in the load control system. The load control information may define operations of the load control system and/or include energy usage information of the load control system. The energy savings selector tool may identify savings information associated with implementing an electrical device in the load control system. Once an electrical device is installed in the load control system, the energy savings selector tool may be used to report energy savings information about the electrical device.

21 Claims, 6 Drawing Sheets

Related U.S. Application Data continuation of application No. 16/105,113, filed on Aug. 20, 2018, now Pat. No. 10,331,100, which is a continuation of application No. 14/632,887, filed on Feb. 26, 2015, now Pat. No. 10,067,488.

(60) Provisional application No. 62/024,344, filed on Jul. 14, 2014, provisional application No. 61/946,079, filed on Feb. 28, 2014.

(51) Int. Cl.
*G06Q 50/06* (2012.01)
*H04L 67/125* (2022.01)

(52) U.S. Cl.
CPC ... *G05B 2219/2642* (2013.01); *H02J 2310/64* (2020.01)

(56) References Cited

U.S. PATENT DOCUMENTS

| | | |
|---|---|---|
| 5,598,880 A | 2/1997 | Cross |
| 6,532,625 B1 | 3/2003 | Stone |
| 8,521,337 B1 | 8/2013 | Johnson |
| 9,113,739 B2 | 8/2015 | Thomas |
| 9,210,778 B2 | 12/2015 | Chen |
| 10,078,319 B2 | 9/2018 | Matsuoka et al. |
| 2004/0158541 A1 | 8/2004 | Notarianni et al. |
| 2005/0097162 A1 | 5/2005 | Budike et al. |
| 2006/0191646 A1 | 8/2006 | Harper et al. |
| 2007/0163725 A1 | 7/2007 | Macha et al. |
| 2008/0172312 A1 | 7/2008 | Synesiou et al. |
| 2010/0324962 A1 | 12/2010 | Nesler et al. |
| 2011/0022242 A1 | 1/2011 | Bukhin et al. |
| 2011/0168340 A1 | 7/2011 | Squillante et al. |
| 2011/0218691 A1 | 9/2011 | O'Callaghan et al. |
| 2012/0029976 A1 | 2/2012 | Tennefoss et al. |
| 2013/0282193 A1 | 10/2013 | Tyagi et al. |

OTHER PUBLICATIONS

Perfumo, et al., "Model-Based Estimation of Energy Savings in Load Control Events for Thermostatically Controlled Loads", May 2014, 14 pages.

Warren, Ryan D. , "Residential building energy use and HVAC system comparison study", Iowa State University, Jan. 1, 2005, pp. 1-158.

\* cited by examiner

Energy Savings Load Selector Tool

| Electrical Device | Usage | Savings | Payback | Save |
|---|---|---|---|---|
| Porch Light | 7 hrs | $35/yr | 1.3 yrs | Buy Now! |
| Kitchen Downlights | 4 hrs | $27/yr | 1.6 yrs | Buy Now! |
| Living Room Lamp | 6 hrs | Need Info | Need Info | Need Info |
| Hallway Downlight | 5 hrs | $18/yr | 2.0 yrs | Buy Now! |
| Kitchen Window Treatment | None | $52/yr | 19.2 yrs | Buy Now! |
| Living Room Occ. Sensor | None | $22/yr | 2.2 yrs | Buy Now! |

Energy Saving Options

| Zone<br>Kitchen Downlights<br>302 | Current<br>Electrical Device<br>60 W<br>Incandescent<br>800 Lumens<br>304 | Quantity<br>2<br>306 | | Usage<br>5 Hours<br>308 | |
|---|---|---|---|---|---|
| Replacement<br>Options<br>310 | Electrical Device | Savings | Payback | Save | |
| | 9.5 W  660 Lumen LED | $40/yr | 1.3 yrs | Buy Now! | |
| | 9.5 W  750 Lumen LED | $40/yr | 2.7 yrs | Buy Now! | |
| | 6 W  600 Lumen LED | $50/yr | 2.7 yrs | Buy Now! | |
| Other<br>Savings Options<br>312 | 120 VAC / 24 VDC Motorized<br>Window Treatment | Need Info | Need Info | Buy Now! | |

Fig. 3

ENERGY SAVINGS SELECTOR TOOL

CROSS-REFERENCE TO RELATED APPLICATIONS

This application is a continuation of U.S. patent application Ser. No. 16/410,032, now U.S. Pat. No. 11,650,554, which is a continuation of U.S. Ser. No. 16/105,113, now U.S. Pat. No. 10,331,100, which is a continuation of U.S. Ser. No. 14/632,887, now U.S. Pat. No. 10,067,488, which claims priority to U.S. Provisional Application No. 61/946,079, filed Feb. 28, 2014 and U.S. Provisional Application No. 62/024,344, filed on Jul. 14, 2014, the disclosures of each of which are hereby incorporated by reference herein in their entireties.

BACKGROUND

In order to reduce energy consumption, consumers are increasingly implementing energy-saving devices in their load control environments, such as in the home, the office, and/or the like. These energy-saving devices include both electrical loads and load control devices. Common electrical loads that are being implemented by consumers today are energy-saving lighting loads. For example, the use of high-efficiency light sources (e.g., gas discharge lamps, such as compact fluorescent lamps (CFL) and light-emitting diode (LED) light sources) is increasing, while the use of low-efficiency light sources (e.g., incandescent lamps or halogen lamps) is decreasing. Particularly, many consumers are replacing older screw-in incandescent lamps with screw-in high-efficiency lamps to provide a quick path to reducing energy consumption. Common electrical load control devices that are being implemented by consumers are electrical motorized window shades. These motorized window shades help save energy by controlling the amount of natural light in a room, as well as the amount of heat that comes in or goes out of the room.

As many energy-efficient devices are on the market, consumers may have difficulty determining which devices to implement in their load control environments. For example, many consumers may have difficulty determining the load or load control device that may provide the greatest cost savings in the shortest period of time. As such, it may be beneficial to provide cost savings information associated with electrical loads and/or load control devices, or other information that may assist a consumer in choosing the loads and/or load control devices to implement in their load control environments.

Once an energy-efficient load or load control device has been installed, consumers often wonder if it was worth the price of purchase. Specifically, consumers are wondering if the energy-saving load or load control device is actually saving energy and/or cost and, if so, how much it is saving them. Thus, it would also be beneficial to provide after-installation savings information to the consumer.

SUMMARY

As described herein, an energy savings selector tool may be used to assist a user in determining electrical devices that, when implemented in a load control system, may reduce an amount of power consumed by the load control system. The electrical devices may include one or more electrical loads and/or load control devices. The load control system may include electrical load control devices that are each configured to control an amount of power provided to one or more electrical loads. The electrical devices may be replaced to reduce the amount of power consumed by the load control system. For example, a low-efficiency light source may be replaced with a high-efficiency light source. Additionally, or alternatively, electrical devices may be added to the load control system to reduce the amount of power consumed by the load control system. For example, an electrical motorized window treatment may be added to a load control system to allow natural light in a load control environment and reduce power consumed by lighting loads. The energy savings selector tool may be used to provide information to assist the user in selecting the electrical devices to be implemented in the load control system.

The energy savings selector tool may provide information for recommended electrical devices for being implemented in the load control system. For example, the energy savings selector tool may provide savings information associated with using one or more electrical devices in the load control system. The savings information may include projected cost savings information and/or payback information for using an electrical device in the load control system. The cost savings information may include a projected amount a user may save by implementing the recommended electrical device in the load control system. The payback information may include a projected amount of time to payback the cost of the recommended electrical device based on the savings a user may receive from the use of the electrical device. The projected savings information may be determined based on current usage of electrical devices in the load control system.

The energy savings selector tool may provide information on electrical devices that are currently implemented in the load control system. For example, the energy savings selector tool may provide savings information for an electrical device after it has been installed and/or implemented in the load control system, or within an otherwise defined time period. The cost savings information may include the amount a user has saved by implementing the electrical device in the load control system. The payback information may include the amount of time left to payback the cost of the electrical device, the time it took to payback the cost of the electrical device, and/or the number of times the electrical device has been paid back. The payback information may be based on the savings a user may receive from the use of the electrical device. The savings information may be determined based on current usage of the electrical devices in the load control system.

The information provided by the energy savings selector tool may be based on load control information associated with the load control system and/or other relevant information that may be used for determining an electrical device for being implemented in the load control system. The load control information may include identification information regarding the electrical loads and/or electrical load control devices in the load control system, association information regarding the electrical loads and/or electrical load control devices, usage information associated with the electrical loads and/or electrical load control devices, an average amount of power associated with an electrical load (e.g., which may be based on a number of electrical loads controlled by an electrical load control device, a load type associated with the electrical loads, and an intensity level associated with the electrical loads), and/or information regarding how the load control devices respond to inputs received from the input devices. The energy savings selector tool may access the load control information to determine electrical devices for being implemented in the load control system, determine the cost savings information, determine the payback information, and/or provide other information that may be useful to the user in determining electrical devices to implement in the load control system. Other information that may be accessed by the energy savings selector tool may include local energy rates for determining the cost of the energy, weather information, and/or GPS data.

The energy savings selector tool may be implemented on a single device, or distributed across multiple devices. For example, the energy savings selector tool may be implemented on a network device (e.g., a personal computer, a smartphone, a tablet, etc.), a system controller device that collects information about the load control system, a remote computing device, or any combination thereof. The network device may provide a user interface for the user to access information provided by the energy savings selector tool. The information that is provided by the network device may be generated locally, or received from the system controller device and/or the remote computing device. If the information provided by the energy savings tool is generated at the network device, the network device may access information from other sources, such as load control information that may be stored at the system controller device, or local energy rates or weather information that may be stored at another remote source, for example.

BRIEF DESCRIPTION OF THE DRAWINGS

FIG. 2 depicts an example screenshot of a user interface that may be displayed at a network device.

FIG. 3 depicts an example screenshot of another user interface that may be displayed at a network device.

DETAILED DESCRIPTION

Figure 1:
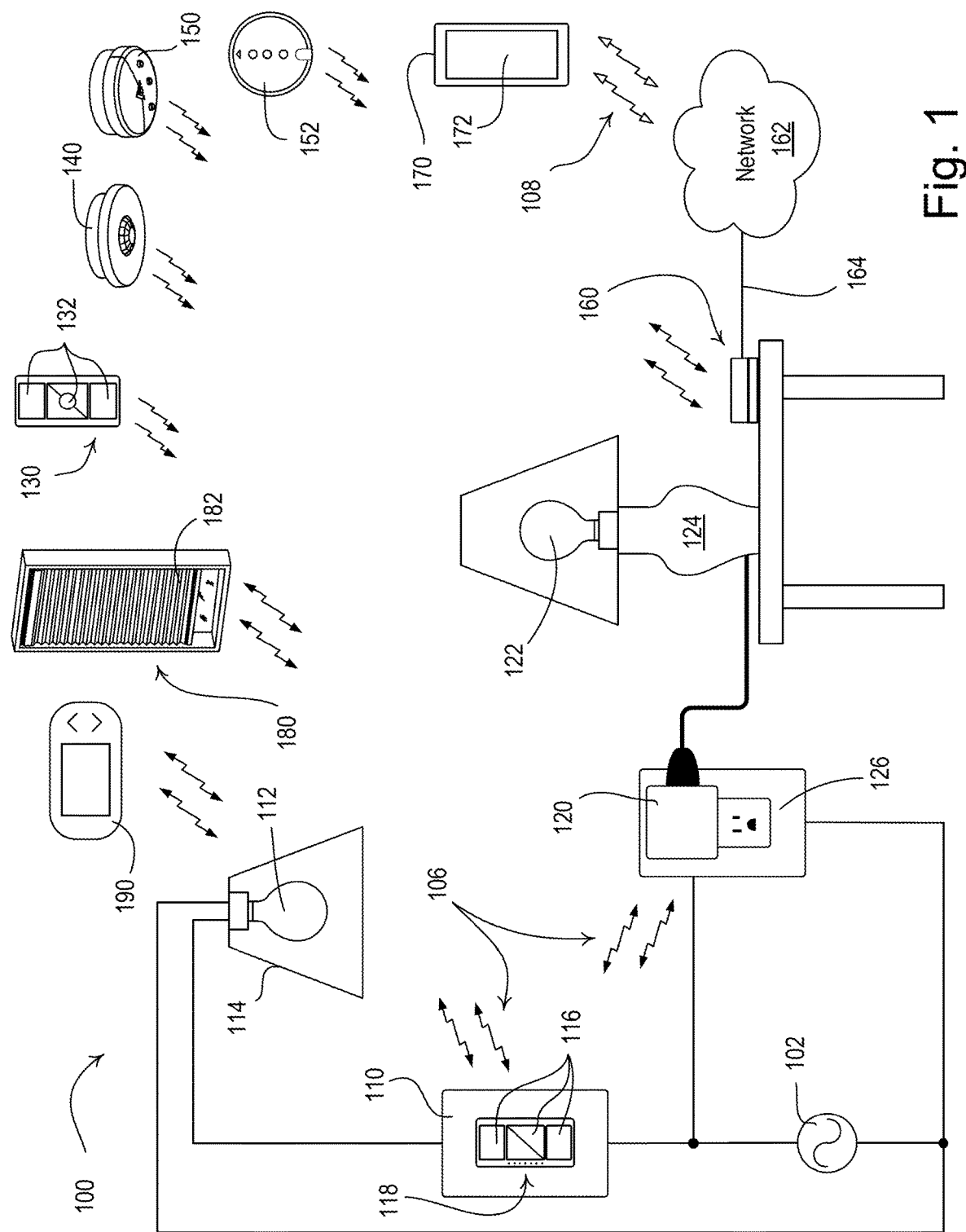
FIG. 1 is a diagram depicting an example load control system for controlling one or more electrical loads.

The foregoing summary, as well as the following detailed description, is better understood when read in conjunction with the appended drawings. For the purposes of illustration, there is shown in the drawings various embodiments that may be implemented, in which like numerals represent similar parts throughout the several views of the drawings, it being understood, however, that the specific methods and instrumentalities disclosed are non-limiting.

FIG. 1 is a simple diagram of an example load control system 100 (e.g., a lighting control, HVAC control, and/or window treatment control system) for controlling an amount of power delivered from an alternating-current (AC) power source 102 to one or more electrical loads. The load control system 100 may comprise various electrical devices. The electrical devices may include the electrical loads or the load control devices for controlling the amount of power provided to the electrical loads. For example, the load control system 100 may include a load control device for controlling a lighting load, such as a wall-mounted dimmer switch 110, coupled in series electrical connection between the AC power source 102 and the lighting load, e.g., a lamp 112 installed in a ceiling mounted downlight fixture 114. Alternatively, the lamp 112 may be installed in a wall-mounted lighting fixture or other lighting fixture mounted to another surface. The dimmer switch 110 may be adapted to be wall-mounted in an electrical wallbox.

The dimmer switch 110 may comprise a plurality of actuators 116 (e.g., buttons) for controlling the lamp 112. In response to actuation of the actuators 116, the dimmer switch 110 may be configured to turn the lamp 112 on and off, and to increase or decrease the amount of power delivered to the lamp and thus increase or decrease the intensity of the lamp from a minimum intensity (e.g., approximately 1%) to a maximum intensity (e.g., approximately 100%). The dimmer switch 110 may comprise a plurality of visual indicators 118, e.g., light-emitting diodes (LEDs), which may be arranged in a linear array and may be illuminated to provide feedback of the intensity of the lamp 112. The dimmer switch 110 may include a control circuit (e.g., a microprocessor or other suitable processing device) that may respond to commands (e.g., from a user-operated device) that may be received via wired and/or wireless communications. For example, the dimmer switch 110 may include a radio frequency (RF) receiver that may receive the commands via an RF signal. Examples of wall-mounted dimmer switches are described in greater detail in U.S. Pat. No. 5,248,919, issued Sep. 28, 1993, entitled LIGHTING CONTROL DEVICE; and U.S. Patent Application Publication No. 2014/0132475, published May 15, 2014, entitled WIRELESS LOAD CONTROL DEVICE, the entire disclosures of which are hereby incorporated by reference.

The load control system 100 may comprise other load control devices for controlling lighting loads, such as a plug-in load control device 120 for example. The plug-in load control device 120 may be coupled in series electrical connection between the AC power source 102 and a lighting load, e.g., a lamp 122 installed in a lamp (e.g., a table lamp 124). Specifically, the plug-in load control device 120 may be plugged into an electrical receptacle 126 that is powered by the AC power source 102 and the table lamp 124 may be plugged into the plug-in load control device 120. Alternatively, the second lamp 122 may be installed in a table lamp or other lamp that may be plugged into the plug-in load control device 120. The plug-in load control device 120 may be implemented as a table-top load control device or a remotely-mounted load control device. Though the table lamp 124 may be plugged into the plug-in load control device 120, other loads (e.g., appliances, electronic devices, etc.) may be similarly plugged into and/or controlled by the plug-in load control device 120. The plug-in load control device 120 may include a control circuit (e.g., a microprocessor or other suitable processing device) that may respond to commands (e.g., from a user-operated device) that may be received via wired and/or wireless communications. For example, the plug-in load control device 120 may include an RF receiver that may receive the commands via an RF signal.

The load control system 100 may comprise one or more load control devices that may control electrical loads other than lighting loads. For example, the load control system 100 may include one or more motorized window treatments, e.g., a motorized window treatment 180 for controlling the position of a covering material 182. The motorized window treatment 180 may include an electrical motor that may be battery-powered, or may receive power from the AC power source 102 or an external DC power source. The motorized window treatment 180 may raise or lower the covering material 182 between a fully-open position and a fully-closed position to prevent natural light from entering, or allow natural light to enter, the space in which the load control system 100 may be installed. The motorized window treatment 180 may also, or alternatively, raise or lower the covering material 182 to control the temperature in the space in which the load control system 100 may be installed. The covering material 182 may include a cellular shade fabric, a plurality of horizontally-extending slats (e.g., a Venetian or Persian blind system), pleated blinds, a roller shade fabric, or a Roman shade fabric, for example. The motorized window treatment 180 may include a control circuit (e.g., a microprocessor or other suitable processing device) that may respond to commands (e.g., from a user-operated device) that may cause the electric motor to raise and lower the covering material 182. The covering material 182 may be raised and lowered a predetermined distance, or to a predetermined location, between the fully-open position and the fully-closed position. The commands may be received via wired and/or wireless communications. For example, the motorized window treatment may include an RF receiver that may receive the commands via an RF signal. Examples of motorized window treatments are described in greater detail in commonly-assigned U.S. Pat. No. 7,839,109, issued Nov. 23, 2010, entitled METHOD OF CONTROLLING A MOTORIZED WINDOW TREATMENT; and U.S. Pat. No. 8,950,461, issued Feb. 10, 2015, entitled MOTORIZED WINDOW TREATMENT, the entire disclosures of which are hereby incorporated by reference.

The load control system 100 may comprise load control devices, e.g., a temperature control device 190, for controlling heating, ventilation, and air conditioning (HVAC) systems or other heating and/or cooling systems for heating and/or cooling the space in which the load control system 100 may be installed. The temperature control device 190 may measure a temperature in the space in which the load control system 100 may be installed and may transmit digital messages to the HVAC system to control the temperature in the space towards a setpoint temperature. The temperature control device 190 may be a thermostat for example. The temperature control device 190 may be battery-powered, or may receive power from the AC power source 102 or an external DC power source. The temperature control device 190 may control power provided to the HVAC system from the AC power source 102. The temperature control device 190 may comprise a visual display for displaying the present temperature in the space and/or the setpoint temperature. The temperature control device 190 may comprise raise and lower temperature buttons for respectively raising and lowering the setpoint temperature to a desired temperature as specified by a user. The temperature control device 190 may be operable to adjust the setpoint temperature in response to digital messages received via wired and/or wireless communications. For example, the temperature control device 190 may include an RF receiver that may receive the commands via an RF signal. The temperature control device 190 may include an RF transmitter that may send instructions to the HVAC system via an RF signal. Examples of temperature control devices are described in greater detail in commonly-assigned U.S. Patent Application Publication No. 2012/0091213, published Apr. 19, 2012, entitled WALL-MOUNTABLE TEMPERATURE CONTROL DEVICE FOR A LOAD CONTROL SYSTEM HAVING AN ENERGY SAVINGS MODE, the entire disclosure of which is hereby incorporated by reference.

The electrical devices in the load control system 100 may further comprise input devices for transmitting digital messages via an input signal to one or more of the load control devices. The digital messages may include commands for controlling the load control devices and/or an identification of the load that may be controlled by the load control device. The input devices may include RF transmitters for transmitting the digital messages. The input devices may include a battery-powered remote control device 130, an occupancy sensor 140, a daylight sensor 150, and/or a shadow sensor 152. The digital messages may be broadcast messages or may include device identifiers for the device or device type the digital messages are intended to control. As the input devices may send digital messages that include commands for controlling the load control devices, the input devices may be load control devices that may indirectly control an electrical load.

The load control devices may each be configured to receive digital messages via wireless signals, e.g., RF signals 106, transmitted by the input devices. In response to the received digital messages, the dimmer switch 110 and the plug-in load control device 120 may each be configured to turn the respective lamp 112, 122 on and off. The dimmer switch 110 and the plug-in load control device 120 may each be configured to increase and decrease the intensity of the respective lamp 112, 122, or set the intensity of the lamp 112, 122 to a predetermined intensity, in response to the received digital messages. In response to the received digital messages, the motorized window treatment 180 may move the position of the covering material 182 up and down a predetermined distance, or to a predetermined location. The temperature control device 190 may increase and decrease a setpoint temperature for the HVAC system a predetermined amount, or change the setpoint temperature to a predetermined temperature, based on the received digital messages.

The remote control device 130 may comprise one or more actuators 132 (e.g., one or more of an on button, an off button, a raise button, a lower button, and a preset button). The remote control device 130 may be a handheld remote control. The remote control device 130 may be mounted vertically to a wall or supported on a pedestal to be mounted on a tabletop. Examples of battery-powered remote control devices are described in greater detail in commonly-assigned U.S. Pat. No. 8,330,638, issued Dec. 11, 2012, entitled WIRELESS BATTERY-POWERED REMOTE CONTROL HAVING MULTIPLE MOUNTING MEANS; and U.S. Patent Application Publication No. 2012/0286940, published Nov. 15, 2012, entitled CONTROL DEVICE HAVING A NIGHT LIGHT, the entire disclosures of which are hereby incorporated by reference.

The remote control device 130 may transmit digital messages via RF signals 106 in response to actuations of one or more of the actuators 132. For example, the RF signals 106 may be transmitted using a proprietary RF protocol, such as the ClearConnect® protocol for example, or any other RF protocol. The digital messages transmitted by the remote control device 130 may include a command and/or identifying information, for example, a unique identifier (e.g., a serial number) associated with the remote control device 130. The remote control device 130 may be assigned to one or more load control devices for controlling one or more electrical loads. For example, the remote control device 130 may be assigned to the dimmer switch 110 for controlling the lamp 112, the plug-in load control device 120 for controlling the lamp 122, the motorized window treatment 180 for controlling the position of the covering material 182, the temperature control device 190 (e.g., thermostat) for controlling the HVAC system, and/or another load control device during a configuration procedure of the load control system 100. After the remote control device 130 is assigned to one or more load control devices, each associated device may be responsive to digital messages transmitted by the remote control device 130 via the RF signals 106.

Examples of methods of associating wireless control devices are described in greater detail in commonly-assigned U.S. Patent Application Publication No. 2008/0111491, published May 15, 2008, entitled RADIO-FREQUENCY LIGHTING CONTROL SYSTEM; and U.S. Patent Application Publication No. 2013/0214609, published Aug. 22, 2013, entitled TWO-PART LOAD CONTROL SYSTEM MOUNTABLE TO A SINGLE ELECTRICAL WALLBOX, the entire disclosures of which are hereby incorporated by reference.

The occupancy sensor 140 may be configured to detect occupancy and/or vacancy conditions in the space in which the load control system 100 may be installed. The occupancy sensor 140 may transmit digital messages to a load control device, such as the dimmer switch 110, the plug-in load control device 120, the motorized window treatment 180, and/or the temperature control device 190, via the RF signals 106 in response to detecting the occupancy and/or vacancy conditions. The dimmer switch 110 and/or the plug-in load control device 120 may each be configured to turn on the respective lamp 112, 122 in response to receiving an occupied command, and/or to turn off the respective lamp 112, 122 in response to receiving a vacant command. The motorized window treatment 180 may be configured to move the covering material a predefined distance, or set the covering material 182 to a predefined location, in response to the occupied command or the vacancy command. The temperature control device 190 may be configured to control an HVAC system to set a setpoint temperature in response to detecting the occupied command or the vacancy command. Examples of RF load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

The daylight sensor 150 may be configured to measure a total light intensity in the space in which the load control system 100 may be installed. The daylight sensor 150 may transmit digital messages including the measured light intensity to a load control device, such as the dimmer switch 110, the plug-in load control device 120, the motorized window treatment 180, and/or the temperature control device 190, via the RF signals 106. The digital messages may be used by the dimmer switch 110 and/or the plug-in load control device 120 for controlling the intensities of the respective lamps 112, 122 in response to the measured light intensity. The digital messages may be used by the motorized window treatment 180 to control the position of the covering material 182 in response to the measured light intensity. The digital messages may be used by the temperature control device 190 to control the setpoint temperature in response to the measured light intensity. Examples of RF load control systems having daylight sensors are described in greater detail in commonly-assigned U.S. Pat. No. 8,410,706, issued Apr. 2, 2013, entitled METHOD OF CALIBRATING A DAYLIGHT SENSOR; and U.S. Pat. No. 8,451,116, issued May 28, 2013, entitled WIRELESS BATTERY-POWERED DAYLIGHT SENSOR, the entire disclosures of which are hereby incorporated by reference.

The shadow sensor 152 may be configured to measure an exterior light intensity coming from outside the space in which the load control system 100 may be installed. The shadow sensor 152 may be mounted on the different facades of a building, such as the exterior or interior of a window, to measure the exterior light intensity depending upon the location of the sun in sky. The shadow sensor 152 may detect when direct sunlight is directly shining into the shadow sensor 152, is reflected onto the shadow sensor 152, or is blocked by external means, such as clouds or a building, and may send digital messages indicating the measured light intensity. The shadow sensor 152 may transmit the digital messages including the measured light intensity to a load control device, such as the dimmer switch 110, the plug-in load control device 120, the motorized window treatment 180, and/or the temperature control device 190, via the RF signals 106. The digital messages may be used by the dimmer switch 110 and/or the plug-in load control device 120 for controlling the intensities of the respective lamps 112, 122 in response to the measured light intensity. The digital messages may be used by the motorized window treatment 180 to control the position of the covering material 182 in response to the measured light intensity. The digital messages may be used by the temperature control device 190 to control the setpoint temperature in response to the measured light intensity. The shadow sensor 152 may also be referred to as a window sensor, a cloudy-day sensor, and/or a sun sensor. An example of a load control system having shadow sensors is described in greater detail in commonly assigned U.S. Patent Application Publication No. 2014/0156079, published Jun. 5, 2014, entitled METHOD OF CONTROLLING A MOTORIZED WINDOW TREATMENT, the entire disclosure of which is hereby incorporated by reference.

The load control system 100 may further comprise a system controller device 160 (e.g., a load controller device or a central controller device). The system controller device 160 may collect load control information about the load control system 100. The system controller device 160 may operate as a master controller or a gateway device (e.g., a bridge) for enabling communications between the load control system 100 and a network 162. The network 162 may be a wired and/or wireless network. The network 162 may include any public or private network, such as a local area network (LAN), a cloud-based network, or the Internet, for example. The system controller device 160 may be connected to a router (not shown) via a wired digital communication link 164 (e.g., an Ethernet communication link) and/or a wireless communication link. The router may allow for communication with the network 162, e.g., for access to the Internet. The system controller device 160 may be connected to the network 162 via a wired or wireless communication medium, e.g., using Wi-Fi technology.

The system controller device 160 may be configured to transmit RF signals 106 to load control devices (e.g., using the proprietary protocol) in response to digital messages received from external devices via the network 162. For example, the system controller device 160 may transmit RF signals 106 to the dimmer switch 110 and/or the plug-in load control device 120 for controlling the respective lamps 112, 122 in response to digital messages received via the network 162. The system controller device 160 may transmit RF signals 106 to the motorized window treatment 180 for controlling the level of the covering material 182. The system controller device 160 may transmit RF signals 106 to the temperature control device 190 for controlling a temperature of the space within which the load control system 100 may be installed. The system controller 160 may be configured to receive RF signals 106 that include digital message from load control devices and/or input devices. The system controller 160 may transmit the digital messages via the network 162 for providing load control information (e.g., usage information, status information, etc.) about the load control system to external devices. The system controller device 160 may operate as a central controller for the load control system 100 to relay digital messages between the input devices, the load control devices, and/or the network 162.

The load control system 100 may further comprise a network device 170, such as, a smart phone (e.g., an iPhone® smart phone, an Android® smart phone, or a Blackberry® smart phone), a personal computer, a laptop, a wireless-capable media device (e.g., MP3 player, gaming device, or television), a tablet device, (e.g., an iPad® handheld computing device), a Wi-Fi or wireless-communication-capable television, or any other suitable computing device. The network device 170 may be operable to transmit digital messages in one or more Internet Protocol packets to the system controller device 160 via RF signals 108 either directly or via the network 162. For example, the network device 170 may transmit the RF signals 108 to the system controller device 160 via a Wi-Fi communication link, a Wi-MAX communications link, a Bluetooth® communications link, a near field communication (NFC) link, a cellular communications link, a television white space (TVWS) communication link, or any combination thereof. The network device 170 may be operable to transmit and/or receive the digital messages 106, such that the network device 170 may be able to communicate directly with the input devices and/or the load control devices, for example. Examples of load control systems operable to communicate with network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The network device 170 may have a visual display 172, which may comprise a touch screen having, for example, a capacitive touch pad displaced overtop the visual display 172, such that the visual display 172 may display soft buttons that may be actuated by a user. The network device 170 may comprise one or more hard buttons, e.g., physical buttons (not shown), in addition to the visual display 172. The network device 170 may download a product control application for allowing a user of the network device 170 to control the lighting control system 100. In response to actuations of the displayed soft buttons and/or hard buttons, the network device 170 may transmit digital messages to the system controller device 160, or other devices in the load control system 100, through wired or wireless communications, such as the wireless communications described herein, for example.

The network device 170 may transmit digital messages to the system controller device 160 via the RF signals 108 for controlling the load control devices. For example, the network device 170 may transmit the digital messages to the system controller device 160 for controlling the dimmer switch 110, the plug-in load control device 120, the motorized window treatment 180, and/or the temperature control device 190. The system controller device 160 may be configured to transmit RF signals 108 to the network device 170 in response to digital messages received from load control devices and/or input devices, such as the dimmer switch 110, the plug-in load control device 120, the remote control device 130, the occupancy sensor 140, the daylight sensor 150, and/or the shadow sensor 152, for example. The digital messages may be transmitted using the proprietary protocol. The network device 170 may display information (e.g., load control information, usage information, status information, etc.) on the visual display 172 in response to the digital messages.

The operation of the load control system 100 may be programmed and/or configured using, for example, a graphical user interface (GUI) software (e.g., a control and/or configuration application software) running on the network device 170. An example of a configuration procedure for a wireless load control system is described in greater detail in commonly-assigned U.S. Patent Application Publication No. 2014/0265568, published Sep. 18, 2014, entitled COMMISSIONING LOAD CONTROL SYSTEMS, the entire disclosure of which is hereby incorporated by reference.

The system controller device 160 may store load control information (e.g., a load control database) that comprises information about the load control system 100. For example, the load control information may include information regarding the operation of the load control system 100, such as the devices in the load control system 100 and/or association information indicating associated devices for performing communications for controlling an electrical load. In response to inputs received via the GUI software, the network device 170 may build and/or edit the load control information stored in the system controller device 160. The user may enter load control information and/or the load control information may be received or obtained from another external source, such as via the network 162, for example.

The load control information may include a load schedule having information regarding the different load control devices of the load control system 100 (e.g., the dimmer switch 110, the plug-in load control device 120, the motorized window treatment 180, and/or the temperature control device 190) and/or the respective loads that may be controlled by each load control device. The load schedule information may include identification information (e.g., unique identifiers, device type, etc.), association information (e.g., addresses and/or identification information regarding associated devices for communication), configuration information (e.g., device communication protocols, device settings that may be enabled, etc.), and/or other information about the load control devices and/or loads in the load control system 100. The load control information may include information about the electrical load and/or load control devices, such as lighting information for the lamps 112, 122, HVAC information for the HVAC that may be controlled by the temperature control device 190, and/or motorized window treatment information for the motorized window treatment 180. The lighting information may include the number of lumens produced by each lighting load of the load control system 100, or a portion thereof (e.g., a room, a floor, a group of floors, etc.). The lighting information may include a number, type, and/or a power rating (e.g., wattage) of lamps that may be controlled by a respective load control device located in the load control system 100 or located in a portion of the load control system 100 (e.g., a room, a floor, a group of floors, etc.). The HVAC information may include an HVAC efficiency, a cooling capacity (e.g., in BTUs), a number of HVAC units, an HVAC unit type, and/or a power rating (e.g., a voltage, amps, etc.) for one or more HVAC units that may be controlled by a respective load control device located in the load control system 100 or located in a portion of the load control system 100 (e.g., a room, a floor, a group of floors, etc.). The motorized window treatment information may include a number of electrical motors or motorized window treatments, a type of electrical motor for one or more motorized window treatment, shade and/or window dimensions for one or more motorized window treatment, and/or a power rating (e.g., a voltage, amps, etc.) of an electrical motor for one or more motorized window treatments that may be controlled by a respective load control device located in the load control system 100 or located in a portion of the load control system 100 (e.g., a room, a floor, a group of floors, etc.).

The load control information (e.g., the load control database) may include information regarding how the load control devices respond to inputs received from the input devices (e.g., the battery-powered remote control device 130, the occupancy sensor 140, the daylight sensor 150, and/or the shadow sensor 152). For example, the load control information may indicate an adjusted dimming level (e.g., increase/decrease ten percent, increase/decrease twenty percent, turn on/off, go to a preset level, etc.) for the dimmer switch 110 and/or the plug-in load control device 120 in response to commands from the input devices. The load control information may indicate an amount to adjust the covering material 182 (e.g., raise/lower ten percent, raise/lower twenty percent, fully raise/lower, go to a preset position, etc.) for the motorized window treatment 180 in response to commands from the input devices. The load control information may indicate an amount to adjust the setpoint temperature (e.g., raise/lower one degree, raise/lower five degrees, go to a preset temperature, etc.) for the temperature control device 190 in response to commands from the input devices. The load control information may indicate a similar or a different response to commands from different input devices. For example, the load control information may indicate that the dimmer switch 110 may adjust a dimming level of the lamp 112 by ten percent for each command from the battery-powered remote control device 130, but turn on or off the lamp 112 for a respective occupancy or vacancy command from the occupancy sensor 140.

The system controller device 160 may be configured to transmit query messages to the load control devices (e.g., the dimmer switch 110, the plug-in load control device 120, the motorized window treatment 180, and/or the temperature control device 190) to receive corresponding feedback information from the load control devices. The feedback information from the dimmer switch 110 or the plug-in load control device 120 may include the corresponding intensity level at which the dimmer switch 110 or the plug-in load control device 120 are controlling power to the respective lamps 112, 122 and/or the measured power from the load control device. The feedback information from the motorized window treatment 180 may indicate a level or setting at which the covering material 182 is set. The feedback information from the temperature control device 190 may indicate the setpoint temperature at which the temperature control device 190 is set for controlling the HVAC system and/or a current room temperature.

The system controller device 160 may be configured to calculate the amount of energy consumed by and/or saved by the use of each electrical device in the load control system 100. The system controller device 160 may measure the length of time that each load control device is providing power to an electrical load. For lighting control devices, the system controller device 160 may also know the intensity level at which the power is provided for the measured period of time. The system controller device 160 may be configured to store a historical record of the power usage, which may include a historical record of power provided to one or more electrical loads by load control devices over a period of time. For lighting control devices, the historical record of power usage may include the intensity level at which power may be provided to the load control devices and may include the corresponding time that the load control device was operating one or more electrical loads at that intensity level in memory. The system controller device 160 may be configured to determine the average power consumed by the loads controlled by each of the load control devices over a period of time, for example, using the historical record of power usage, the number, the type, and/or the power (e.g., watts, volts, amps, etc.) of the electrical load (e.g., lamp 112, lamp 122, HVAC unit, electrical motor of the motorized window treatment 180, etc.) controlled by the respective load control device (e.g., the dimmer switch 110, the plug-in load control device 120, the motorized window treatment 180, the temperature control device 190, etc.).

The system controller device 160 may be configured to predict the amount of energy that may be saved by the use of a recommended electrical device. In addition, the system controller device 160 may be configured to measure the amount of energy that may be saved by the use of the recommended electrical device after installation. The recommended electrical device may include any electrical load and/or electrical load control device.

The predicted amount of energy savings may be based on the replacement or addition of an electrical load, such as the replacement of a lighting load or the addition of an electrical motor in a motorized window treatment, for example. The system controller device 160 may be configured to measure the amount of energy that may be saved by using higher-efficiency light sources for the lamps 112, 122 that may consume less power. Before the higher-efficiency lamps 112, 122 are installed, the system controller device 160 may be configured to calculate a projected energy savings if the higher-efficiency lamps 112, 122 are installed in the load control system as compared to lower-efficiency light sources that may consume more power. The projected energy savings may be based on a current consumption of power by lower-efficiency light sources in the load control system 100 and a projected reduction in usage after installing the higher-efficiency lamps 112, 122 that may consume less power. The system controller device 160 may also, or alternatively, calculate the actual energy savings based on the use of the higher-efficiency lamps 112, 122 after being installed in the load control system 100. The savings after installation may be based on the consumption of power by the lower-efficiency lamps in the load control system 100 before installing the higher-efficiency lamps 112, 122 and the consumption of power by the higher-efficiency lamps 112, 122 after installation.

The predicted amount of energy savings may be based on the replacement or addition of a load control device, such as the replacement or addition of a temperature control device or a motorized window treatment, for example. The system controller device 160 may be configured to measure the amount of energy that may be saved by the use of the motorized window treatment 180 before the motorized window treatment 180 is installed. The motorized window treatment 180 may raise the covering material 182 to allow natural light or external heat into the space in which the load control system 100 may be installed. The motorized window treatment 180 may lower the covering material 182 to prevent natural light from entering, or prevent heat from entering or escaping from, the space in which the load control system 100 may be installed. The raising or lowering of the covering material 182 may allow a load control device (e.g., the dimmer switch 110, the plug-in load control device 120, the temperature control device 190, etc.) to reduce the amount of energy used for controlling the respective loads (e.g., the lamp 112, the lamp 122, the HVAC system, etc.). For example, the raising of the covering material 182 may allow the dimmer switch 110 to reduce the intensity level of the power provided to the lamp 112 due to the natural light, and/or allow the temperature control device 190 to provide power to the HVAC system less often due to the heat from the natural light.

The system controller device 160 may be configured to measure the amount of energy that may be saved by using the motorized window treatment 180. Before the motorized window treatment 180 is installed, the system controller device 160 may be configured to calculate a projected energy savings if the motorized window treatment is installed in the load control system as compared to when the motorized window treatment is not installed. The projected energy savings may be based on a current consumption of power by electrical loads in the load control system 100 and a projected reduction in usage after installing the motorized window treatment 180. The system controller device 160 may also, or alternatively, calculate the actual energy savings based on the use of the motorized window treatment 180 after being installed in the load control system 100. The savings after installation may be based on the consumption of power by the electrical loads in the load control system 100 before installing the motorized window treatment 180 and the consumption of power by the electrical loads after installing the motorized window treatment 180.

The load control device may be an input device, such as the occupancy sensor 140 or other sensing device, for example. The system controller device 160 may be configured to measure the amount of energy that may be saved by the use of the occupancy sensor 140 before the occupancy sensor 140 is installed. The occupancy sensor 140 may detect the occupancy or vacancy of a space in the load control environment and may send instructions to the load control devices for controlling an electrical load. The control of the electrical loads based on occupancy may save on the energy consumed by the load control system, as the electrical loads (e.g., lighting loads, HVAC systems, etc.) may consume less power when a room is unoccupied. Other input devices (e.g., the battery-powered remote control device 130, the daylight sensor 150, the shadow sensor 152, etc.) may similarly be used to save on the amount of energy consumed by the load control system. The battery powered remote control device 130 may save on the amount of energy consumed, as the remote control device 130 may make the amount of power consumed by an electrical load (e.g., lighting loads, HVAC systems, etc.) easier to change. The daylight sensor 150 and/or the shadow sensor 152 may save on the amount of energy consumed, as electrical loads (e.g., lighting loads, HVAC systems, etc.) in the load control system may consume less power when more natural light is being received in a space.

Before an input device is installed, the system controller device 160 may be configured to calculate a projected energy savings if the input device is installed in the load control system as compared to when the input device is not installed. The projected energy savings may be based on a current consumption of power by electrical loads in the load control system 100 and a projected reduction in usage after installing the input device. The system controller device 160 may also, or alternatively, calculate the actual energy savings based on the use of the input device after being installed in the load control system 100. The savings after installation may be based on the consumption of power by the electrical loads in the load control system 100 before installing the input device and the consumption of power by the electrical loads after installing the input device. Though the examples described herein may calculate the energy savings for use of a lighting load, a motorized window treatment, and various input devices, energy savings may be similarly calculated based on the addition or replacement of any other electrical device, such as any electrical load or any load control device.

The projected energy savings for an electrical device may be calculated based on the historical record of power usage for other load control systems. For example, the system controller device 160 may compare the historical record of power usage for the load control system 100 against a historical record of power usage for similar load control systems that include recommended electrical devices. A similar load control system may include a similar number of loads and/or load control devices, similar types of loads and/or load control devices, and/or a similar configuration of the load control system. The number of loads and/or load control devices in a similar load control system may vary by a predetermined number.

The system controller device 160 may perform the comparison locally or send, via the network 162 for example, the historical record of power usage to an external computing device and may receive, via the network 162, comparable power usage information for a load control system that also includes the recommended electrical devices to determine the savings when the recommended or installed electrical devices are implemented. The system controller device 160 may send, via the network 162, the average power consumed by the loads of each of the load control devices over a period of time, the average amount of time each of the loads is energized over a period of time, the types of loads and/or load control devices in the load control system, and/or the historical record of the load control devices to an external computing entity and may receive, via the network 162, the projected savings. The system controller device 160 may store the projected energy savings and may provide them to the user via the network device 170. The projected energy savings may be used to recommend electrical devices that may be installed.

After an electrical device is installed, the system controller device 160 may store the power consumed by the loads controlled by each of the load control devices. The system controller device 160 may keep a historical record of power usage after the electrical device is implemented. The system controller device 160 may perform a comparison of power usage information that was tracked before the implementation of the electrical device with the power usage information tracked after implementation to determine the savings after implementation of the electrical device. The system controller device 160 may also send the power usage information to an external device, via the network 162 for example, which may perform the comparison and send the savings information back to the system controller device 160. The savings after implementation may be provided to the network device 170 for display to a user. The user may also receive savings information within a defined time period after installation (e.g., each month, each year, etc.), which may be stored at the system controller device 160, and/or determined (e.g., by the system controller device 160, the network device 170, or another device) from the power usage information stored at the system controller device 160.

The GUI software running on the network device 170, or otherwise provided to the network device 170 via the network 162, may provide an interface for an energy savings selector tool to display information to the user on the network device 170. The energy savings selector tool may include options that may assist the user in determining electrical devices of the load control system that may be added or replaced to save energy. For example, the energy savings selector tool may indicate which of the low-efficiency light sources (e.g., the lamps 112, 122) of the load control system may be replaced with high-efficiency light sources (e.g., screw-in LED lamps). The energy savings selector tool may also, or alternatively, indicate that the load control system may save on energy usage with the replacement of one or more loads (e.g., high-efficiency lamps), the replacement of one or more load control devices (e.g., improved dimmer switches), the addition of one or more loads, and/or the addition of one or more load control devices (e.g., motorized window treatment 180 and/or the occupancy sensor 140).

The energy savings selector tool may provide savings information that may indicate the amount of savings that may be accrued or that has accrued as a result of using a recommended electrical device. The savings information may include cost savings information and/or payback information for the electrical device options that are provided. For example, the energy savings selector tool may indicate the lamp options that may result in the greatest cost savings and/or shortest payback time period. The energy savings selector tool may access the load control information (e.g., the number, type, and/or power rating of the electrical loads controlled by the respective load control devices) stored by the system controller device 160. The load control information may include the usage information for the electrical devices in the load control system 100. The usage information may indicate the average power consumed by each of the loads controlled by the load control devices, an average amount of time each of the loads is energized, and/or the historical record of power usage over a period of time. The usage information may be determined based on the number, type, and/or power rating of the electrical loads controlled by a load control device. When the electrical load is a lighting load, the load control information may include the number, type, wattage, and/or lumen output of the lighting load.

The energy savings selector tool may be configured to access electrical device information for electrical devices, such as electrical loads and/or load control devices, that may be purchased to increase the energy efficiency and/or decrease the energy costs of the load control system 100. For example, the energy savings selector tool may be configured to access and/or display lamp information (e.g., a lamp database) regarding one or more high-efficiency light sources that may be available for purchase from one or more manufacturers. The energy savings selector tool may be configured to access and/or display motorized window treatment information and/or covering material information (e.g., a motorized window treatment and/or covering material database) regarding one or more window treatments and/or covering materials that may be available for purchase from one or more manufacturers. The energy savings selector tool may be configured to access and/or display input device information (e.g., a sensor database) regarding one or more input devices that may be available for purchase from one or more manufacturers. The electrical device information may be stored on the network device 170, the system controller device 160, and/or an external computing device that may be accessed via the network 162.

The energy savings selector tool may have access to energy and/or weather information at the location in which the load control system 100 may be installed. For example, the energy savings selector tool may access local energy rates at the location in which the load control system 100 may be installed. The energy savings selector tool may be configured to receive peak and/or off-peak energy rates that correspond to different time periods of a day. The energy savings selector tool may access weather information at the location in which the load control system 100 may be installed to assist in determining a current or expected amount of sunlight, an amount of cloud cover, and/or an outside temperature. The local energy rates and/or weather information may be entered into the energy savings selector tool manually by a user or may be accessed automatically (e.g., using a GPS location of the network device 170 or the load control system 100). The energy savings selector tool may retrieve the local energy rates and/or weather information via the network 162. For example, the local energy rates may be retrieved from an electrical utility company and/or the local weather information may be retrieved from a weather provider.

The energy savings selector tool may use the load control information (e.g., the usage information) in the system controller device 160, the electrical device information, the local energy rates, the local weather information, GPS information, time of day information, time of year information, and/or information from the input devices (e.g., daylight sensor 150, shadow sensor 152, etc.) to determine one or more electrical devices that may be implemented in the load control system 100 to provide a cost savings and/or a payback time period for the cost of the items that may be purchased. For example, the energy savings selector tool may use the usage information stored in the load control information (e.g., load control database), lamp information, and/or the local energy rates to determine one or more high-efficiency light sources that may replace low-efficiency light sources (e.g., presently-installed low-efficiency light sources) to provide the cost savings and/or payback time period. The energy savings selector tool may use the lumen output of the low-efficiency light sources (e.g., previously-installed low-efficiency light sources) to choose high-efficiency light sources having equivalent or similar outputs. The energy savings selector tool may use the usage information stored in the load control information (e.g., load control database), motorized window treatment information, local weather information, and/or time of year information to determine the cost savings and/or payback time period if, for example, a motorized window treatment is installed.

The energy savings selector tool may use the usage information of the dimmer switch 110 and the plug-in load control device 120 for controlling respective lamps 112, 122, the usage information of the temperature control device 190 for controlling the HVAC system and/or the local energy rates to determine an electrical cost for the load control environment. The energy savings selector tool may project a savings, such as an energy savings or a cost savings, that may indicate an amount a user may save if the user installed and/or implemented a recommended electrical device, such as high-efficiency light sources (e.g., the lamps 112, 122), the motorized window treatment 180, an input device (e.g., the remote control device 130, the occupancy sensor 140, the daylight sensor 150, the shadow sensor 152, etc.), or another electrical device.

The projected savings may be based on the amount of power saved by using the recommended electrical device. For example, the amount of savings may include the difference in power consumed by the low-efficiency lamps and the high-efficiency lamps. When a motorized window treatment is recommended or installed, the amount of savings may include the reduced amount of power that may be provided to the lamps 112, 122 and/or the amount of power provided to the HVAC system as a result of the implementation of the motorized window treatment 180. When a sensing device (e.g., the occupancy sensor 140, the daylight sensor 150, the shadow sensor 152, etc.) is recommended or installed, the amount of savings may include the reduced amount of power that may be provided to the lamps 112, 122 and/or the amount of power provided to the HVAC system as a result of the implementation of the sensing device. Though the examples described herein may calculate the savings for use of a lighting load, a motorized window treatment, and a sensing device, the savings may be similarly calculated for any other electrical device that may be used in a load control system, such as any electrical load or any load control device.

The anticipated savings, such as energy savings or cost savings, may be based on similar load control environments that have similar electrical devices installed therein. The projected savings may take into account the local energy rates, the local weather information, time of day and/or time of year information, information collected from the daylight sensor 150 regarding the average amount of light in the load control environment 100, information collected from the shadow sensor 152 regarding the average amount of direct sunlight received from outside the load control environment, and/or information regarding any currently installed electrical devices. The energy savings selector tool may provide the cost information and/or the projected savings for one or more electrical devices to give the user purchasing options. For example, the energy savings selector tool may provide the cost information and/or the projected savings if a motorized window treatment is installed, or for one or more types of high-efficiency lamps that may replace one or more low-efficiency lamps in a load control environment.

The energy savings selector tool may provide the cost information and/or projected savings for materials or devices associated with the electrical devices as well. For example, the energy savings selector tool may provide cost information and/or projected savings information for one or more covering materials that may be installed in a motorized window treatment. Different materials may allow different amounts of light into the load control environment and may have a different effect on the amount of savings that may result from using the covering material. Based on the amount of savings that may result from using an electrical device or materials associated with an electrical device, the energy savings selector tool may provide the projected payback time period for paying back the cost of the electrical device or materials associated with an electrical device.

The energy savings selector tool may inform the user if another item is needed or used with the recommended electrical device. For example, when the energy savings selector tool recommends a high-efficiency lamp that may replace a low-efficiency lamp, the energy savings selector tool may also recommend another dimmer switch and/or lighting ballast that may be designed to work with high-efficiency lamps. The energy savings selector tool may inform the user if another load control device is needed or used to control the recommended loads for purchase. The energy savings selector tool may inform the user if another load is used with the recommended load control device. The energy savings selector tool may use the cost of the additional items when determining the payback time period.

The energy savings selector tool may be executed by the system controller device 160, the network device 170, and/or a remote computing device or server (e.g., on the cloud). The system controller device 160 may be located in the load control system 100, or may be located remotely and may send information to devices in the load control system 100. The energy savings selector tool may be executed at the system controller device 160 or another remote computing device and may provide information to a user interface on the network device 170. In another example, the energy savings selector tool may be executed at the network device 170 and may access information, such as load control information for example, at the system controller device 160, another remote computing device, and/or another source. The energy savings selector tool may be executed at the system controller device 160, the remote computing device, or the network device 170 individually, or the energy savings selector tool may be distributed across one or more of these and/or other devices.

The load control system 100 may comprise one or more other types of load control devices, such as, for example, a dimming ballast for driving a gas-discharge lamp; a light-emitting diode (LED) driver for driving an LED light source; a dimming circuit for controlling the intensity of a lighting load; a screw-in luminaire including a dimmer circuit and an incandescent or halogen lamp; a screw-in luminaire including a ballast and a compact fluorescent lamp; a screw-in luminaire including an LED driver and an LED light source; an electronic switch, a controllable circuit breaker, or other switching device for turning an appliance on and off; a controllable electrical receptacle or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; an air conditioner; a compressor; an electric baseboard heater controller; a controllable damper; a variable air volume controller; a fresh air intake controller; a ventilation controller; hydraulic valves for use radiators and radiant heating system; a humidity control unit; a humidifier; a dehumidifier; a water heater; a boiler controller; a pool pump; an electrical appliance, such as a refrigerator, a freezer, or the like; a television or computer monitor; a video camera; an audio system or amplifier; an elevator; a power supply; a generator; an electric charger, such as an electric vehicle charger; an alternative energy controller; or any combination of load control devices.

The load control system 100 may comprise one or more other types of input devices, such as, for example, temperature sensors, humidity sensors, radiometers, pressure sensors, smoke detectors, carbon monoxide detectors, air-quality sensors, motion sensors, security sensors, proximity sensors, fixture sensors, partition sensors, keypads, kinetic or solar-powered remote controls, key fobs, cell phones, smart phones, tablets, personal digital assistants, personal computers, laptops, timeclocks, audio-visual controls, safety devices, power monitoring devices (e.g., power meters, energy meters, utility submeters, utility rate meters, etc.), central control transmitters, residential controllers, commercial controllers, industrial controllers, or any combination of these input devices and/or other input devices.

FIG. 2 is an example screenshot of a user interface 200 that may be displayed by the energy savings selector tool on the visual display 172 of the network device 170. The user interface 200 may be provided in the form of a load selector table, as shown in FIG. 2, or other format to provide the information to the user of the network device 170. The user interface 200 may include electrical device information 202. The electrical device information 202 may include identifiers of electrical devices, such as electrical loads and/or load control devices that may control a load. The identifiers may identify types of loads and/or load control devices. The identifiers may identify the various zones in which the loads and/or load control devices may be located in the load control system 100 (e.g., as may be stored in the control information in the system controller device 160). As shown in FIG. 2, the electrical device information 202 includes a porch light, kitchen downlights, a living room lamp, a hallway downlight, a kitchen window treatment, and a living room occupancy sensor, though other types of electrical devices may be identified.

The user interface 200 may include usage information 204 that may indicate the amount of time that each of the identified electrical devices is used. The usage information 204 may also, or alternatively, indicate the amount of power consumed by the electrical devices (not shown). For example, the usage information 204 may indicate an amount of time that an electrical load is energized or an amount of power consumed by the electrical load. The usage information 204 may be determined from the usage information that may be stored by the system controller device 160 or other device.

The user interface 200 may include savings information. The savings information may include energy savings information (not shown), cost savings information 206, and/or payback information 208. The cost savings information 206 may indicate the respective cost savings for each of the identified electrical devices. The cost savings information 206 may be indicated in any increment of time, such as per week savings, per month savings, or per year savings, for example. The payback information 208 may indicate the respective payback time period for each of the identified electrical devices. The payback information 208 may indicate the amount of time left to pay back the cost of one or more electrical devices, as shown in FIG. 2. The payback information 208 may also, or alternatively, indicate the amount of time it took to payback the cost of the electrical devices and/or the number of times the electrical devices have been paid back. The savings information may also, or alternatively, include energy savings information that may indicate the amount of energy (e.g., in units) that may be saved or that is being saved by an electrical device.

The payback information 208 may be based on the cost savings information 206 and/or the usage information 204. For example, the payback information 208 may indicate the respective payback time period for one or more low-efficiency light sources (e.g., presently-installed low-efficiency light sources) when they are replaced with selected high-efficiency light sources (e.g., as determined by the energy savings selector tool). Different cost savings information 206 and/or payback information 208 may be provided for different replacement electrical devices or the cost savings information 206 and/or payback information may be based on a predetermined electrical device (e.g., the device with the greatest savings and/or fastest payback).

The payback information 208 may take into account the number of electrical devices that may be purchased. The payback information may also assume a similar usage of the identified electrical devices (e.g., when a load or load control device may be replaced), or anticipate a reduced usage of electrical devices in the system by the implementation of the purchased item (e.g., when a motorized window treatment 180 is implemented in the load control system 100). The anticipated reduced usage may be based on a reduced usage in similar load control systems that include the identified electrical device.

The cost savings information 206 and/or the payback information 208 may display notifications 212 that may indicate a request for more information. The notifications 212 may be displayed if the energy savings selector tool is unable to determine the respective cost savings information 206 and/or payback information 208 for the identified electrical devices. For example, the energy savings selector tool may display the notifications 212 if the load control information does not include one or more of the number, type, and/or power rating (e.g., watts, volts, amps, etc.) of the identified electrical devices. The user may select one of the notifications 212 to link to a screen where the missing information may be entered.

The user interface 200 may include save information 210. The save information 210 may provide information for the user to purchase the identified electrical devices to save on energy usage and/or costs. The save information 210 may identify one or more replacement devices or additional devices to implement on the load control system for saving energy and/or cost. For example, the save information 210 may include one or more high-efficiency light sources (e.g., as determined by the energy savings selector tool) that may replace one or more low-efficiency light sources identified in the electrical device information 202. The save information 210 may also, or alternatively, indicate electrical devices that may be added to the system to save on energy usage and/or cost, such as a motorized window treatment, an occupancy sensor, or other electrical device, for example. The save information 210 may include one or more buttons 214 that may be selected by the user to purchase the identified electrical device. For example, the buttons 214 may link to a screen where the identified electrical devices may be purchased. If additional items are recommended for use with the electrical devices, the buttons 214 may provide purchase information for those items.

FIG. 3 is another example screenshot of a user interface 300 that may be displayed by the energy savings selector tool on the visual display 172 of the network device 170. The user interface 300 may be provided in the form of a load selector table, as shown in FIG. 3, or other format to provide energy savings and/or cost savings options to the user of the network device 170. The user interface 300 may include zone information 302, current electrical device information 304, quantity information 306, and/or usage information 308. The zone information 302 may include an identifier of the zone or area in which an energy savings option may be located. The current electrical device information 304 may identify a currently installed or currently identified electrical device. The current electrical device information 304 may identify a load type and/or load control device type (e.g., incandescent lamp, LED lamp, motorized window treatment, etc.), a power rating associated with the load (e.g., watts, volts, amps, etc.), and/or other identifying information (e.g., number of lumens for a lighting load, type of covering material for a motorized window treatment, etc.). The quantity information 306 may indicate the quantity of the identified electrical devices in the identified zone, or a subset thereof. For example, the quantity information 306 may identify the quantity of electrical devices in the identified zone that the user would like to replace. The usage information 308 may indicate the amount that each of the identified electrical devices are used in the load control system. The usage information 308 may indicate the amount of time that each of the identified electrical devices are used and/or the amount of power consumed by the electrical devices over a period of time (not shown). The usage information 308 may indicate an amount of time that an electrical load is energized or an amount of power consumed by the electrical load. The usage information 308 may be determined from the usage information that may be stored by the system controller device 160 or another device.

The user interface 300 may include replacement options 310 and/or other savings options 312 that may identify energy saving options that may be installed in the load control system 100. The replacement options 310 may identify loads that may replace the electrical devices identified in the current electrical device information 304. The replacement options 310 may be based on a filter that may be provided to the user for selecting user preferences. For example, the replacement options 310 may be based on a predefined minimum and/or maximum cost, a minimum and/or maximum savings, an electrical device type, a manufacturer, an available quantity, an amount of time for payback of the cost, an amount of power associated with the load (e.g., watts, volts, amps, etc.), and/or a rating associated with the replacement options 310.

The other savings options 312 may identify energy saving options that may be added to the load control system 100 or that may replace an electrical device in the load control system 100 other than the identified electrical device in the current electrical device information 304. The other savings options 312 may be determined based on the usage information of one or more electrical devices other than those identified in the current electrical device information 304. For example, the other savings options 312 may be provided for loads that may not have usage information stored in the load control information (e.g., may not be implemented in the load control system 100) and that may provide energy savings to the load control system 100. The other savings options 312 may be provided for electrical devices that may have usage information, but may be unidentified in the current electrical device information 304. The other savings options 312 may be based on a filter that may be provided to the user for selecting user preferences, such as the user preferences described herein, for example.

The user interface 300 may include information about the replacement options 310 and/or the other savings options 312. For example, the user interface 300 may include electrical device information 314, cost savings information 316, payback information 318, and/or save information 320. The user interface 300 may include other information, such as the amount of energy (e.g., in units) that may be saved or that is being saved by an electrical device.

The electrical device information 314 may identify loads that may be added to (e.g., indicated by the other savings options 312), or replace other loads (e.g., indicated by the replacement options 310) in, the load control system 100. The cost savings information 316 may indicate the respective cost savings or total cost savings for each of the identified loads in the replacement options 310 and/or the other savings options 312. The cost savings may be indicated in any increment of time, such as per week savings, per month savings, or per year savings, for example. The payback information 318 may indicate the respective payback time period or total payback time period for each of the identified loads in the replacement options and/or the other savings options 312.

The payback information 318 may be based on the savings information 316 and/or the usage information 308. For example, the payback information 318 may indicate the respective payback time period for one or more low-efficiency light sources (e.g., presently-installed low-efficiency light sources) that may be installed in the zone 302 when they are replaced with identified high-efficiency light sources, which may be identified by replacement options 310. The payback information 318 may take into account the number of electrical devices that may be purchased and/or the usage information associated therewith, which may be stored in the load control information.

The savings information 316 and/or the payback information 318 may display notifications 322 that may indicate a request for more information. For example, the notifications 322 may be displayed if the energy savings selector tool is unable to determine the respective cost savings information 316 and/or the payback information 318 for the identified electrical devices. The energy savings selector tool may display the notifications 322 if the load control information does not include one or more of the number, type, and/or power rating (e.g., watts, volts, amps, etc.) of the identified electrical devices. The user may select one of the notifications 322 to link to a screen where the missing information may be entered.

The user interface 300 may include save information 320. The save information 320 may provide information for the user to purchase the identified electrical devices to save on energy usage and/or costs. The save information 320 may include one or more buttons 324 that may be selected by the user to purchase the identified electrical device. For example, the buttons 324 may link to a screen where the identified electrical devices may be purchased. If additional items are recommended for use with the electrical devices, the buttons 324 may provide purchase information for those items.

Figure 4:
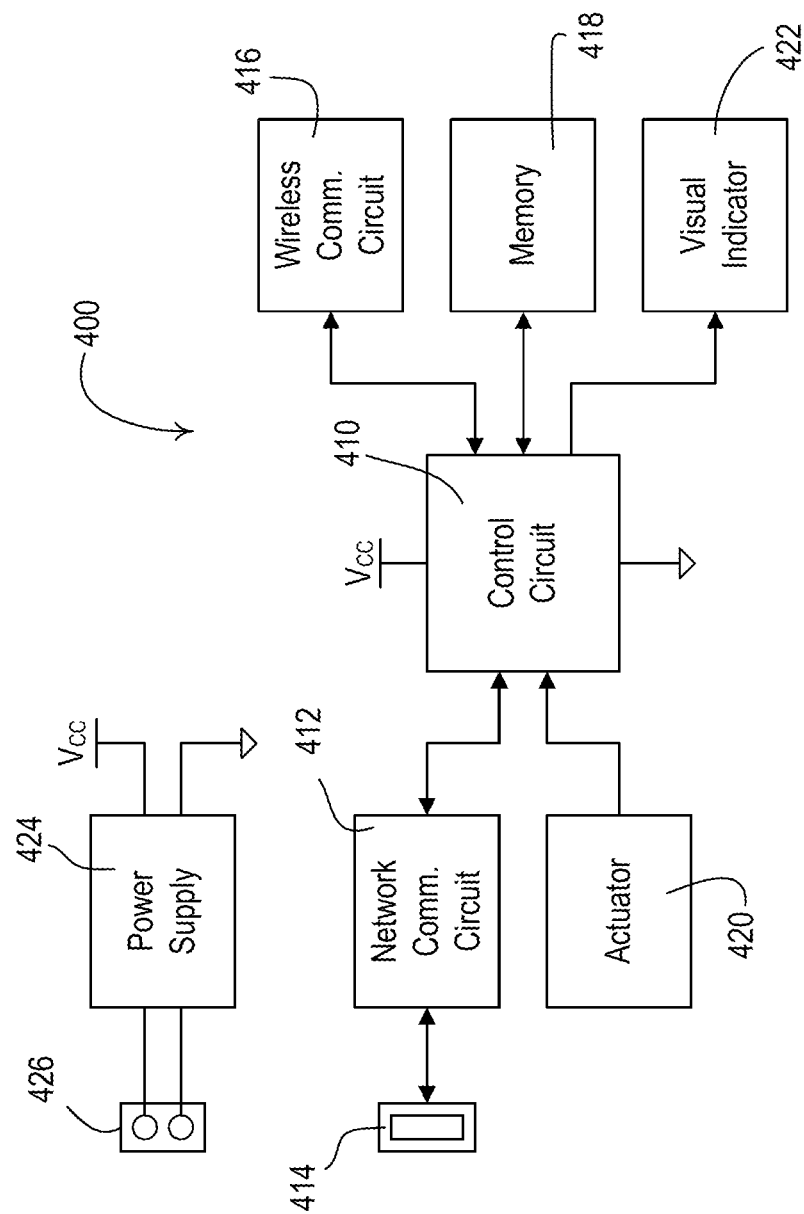
FIG. 4 is a simplified block diagram of an example wireless control device.

FIG. 4 is a simplified block diagram of an example wireless control device 400, which may be deployed as, for example, the system controller device 160 of the load control system 100 shown in FIG. 1. The wireless control device 400 may comprise a control circuit 410, which may include one or more of a processor (e.g., a microprocessor), a microcontroller, a programmable logic device (PLD), a field programmable gate array (FPGA), an application specific integrated circuit (ASIC), or any suitable processing device. The control circuit 410 may perform signal coding, data processing, power control, input/output processing, and/or any other functionality that enables the wireless control device 400 to perform as described herein.

The wireless control device 400 may comprise a network communication circuit 412 that may be coupled to a network connector 414 (e.g., an Ethernet jack), which may be adapted to be connected to a wired digital communication link (e.g., an Ethernet communication link) for allowing the control circuit 410 to communicate with network devices on a network (e.g., the network 162 shown in FIG. 1). The network communication circuit 412 may be configured to be wirelessly connected to the network, e.g., using Wi-Fi technology to transmit and/or receive RF signals (e.g., the RF signals 108 shown in FIG. 1).

The wireless control device 400 may comprise a wireless communication circuit 416, for example, including an RF transceiver coupled to an antenna for transmitting and/or receiving RF signals (e.g., the RF signals 106 shown in FIG. 1). The wireless communication circuit 416 may communicate using a proprietary protocol (e.g., the ClearConnect® protocol). The control circuit 410 may be coupled to the wireless communication circuit 416 for transmitting digital messages via the RF signals 106, for example, to control the load control devices (e.g., the dimmer switch 110, the plug-in load control device 120, the motorized window treatment 180, and/or the temperature control device 190) in the load control system 100 in response to digital messages received via the network communication circuit 412. The control circuit 410 may be configured to receive digital messages, for example, from the load control devices and/or the input devices (e.g., the dimmer switch 110, the plug-in load control device 120, the remote control device 130, the occupancy sensor 140, the daylight sensor 150, the shadow sensor 152, the motorized window treatment 180, and/or the temperature control device 190). For example, the control circuit 410 may be operable to receive a digital message including the intensity of a lighting load (e.g., one of the lamps 112, 122 of the load control system 100 shown in FIG. 1), and to transmit, via the wireless communication circuit 416 or the network communication circuit 412, a digital message including the intensity of the lighting load to the network device 170 for displaying the intensity on the visual display 172.

The control circuit 410 may be responsive to an actuator 420 for receiving a user input. For example, the control circuit 410 may be operable to associate the wireless control device 400 with one or more control devices of the load control system 100 in response to actuations of the actuator 420 during a configuration procedure of the load control system 100. The wireless control device 400 may comprise additional actuators to which the control circuit 410 may be responsive.

The control circuit 410 may store information in and/or retrieve information from the memory 418. The memory 418 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 410 may access the memory 418 for executable instructions and/or other information that may be used by the wireless control device 400. The control circuit 410 may store the unique identifiers (e.g., serial numbers) of the control devices to which the wireless control device 400 is associated in the memory 418. The control circuit 410 may access instructions in the memory 418 for executing the energy savings selector tool, or portions thereof. The control circuit 410 may store the load control information, electrical device information, and/or other information that may be used by the energy savings selector tool in the memory 418.

The control circuit 410 may illuminate a visual indicator 422 to provide feedback to a user of the load control system 100. For example, the control circuit 410 may blink or strobe the visual indicator 422 to indicate a fault condition. The control circuit 410 may be operable to illuminate the visual indicator 422 different colors to indicator different conditions or states of the wireless control device 400. The visual indicator 422 may be illuminated by, for example, one or more light-emitting diodes (LEDs). The wireless control device 400 may comprise more than one visual indicator.

The wireless control device 400 may comprise a power supply 424 for generating a DC supply voltage $V_{CC}$ or powering the control circuit 410, the network communication circuit 412, the wireless communication circuit 416, the memory 418, the visual indicator 422, and/or other circuitry of the wireless control device 400. The power supply 424 may be coupled to a power supply connector 426 (e.g., a USB port) for receiving a supply voltage (e.g., a DC voltage) and/or for drawing current from an external power source.

Figure 5:
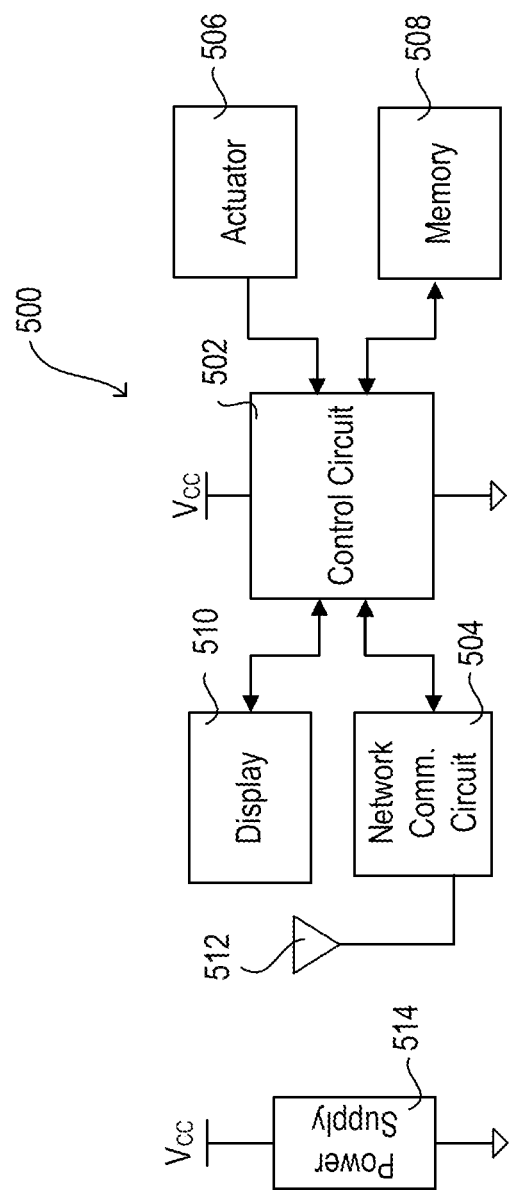
FIG. 5 is a simplified block diagram of an example network device.

FIG. 5 is a block diagram illustrating an example network device, e.g., a network device 500, which may be deployed as, for example, the network device 170 of the load control system 100 shown in FIG. 1. The network device 500 may comprise a control circuit 502, which may include one or more of a processor (e.g., a microprocessor), a microcontroller, a programmable logic device (PLD), a field programmable gate array (FPGA), an application specific integrated circuit (ASIC), or any suitable processing device. The control circuit 502 may perform signal coding, data processing, power control, image processing, input/output processing, and/or any other functionality that enables the network device 500 to perform as described herein.

The control circuit 502 may store information in and/or retrieve information from the memory 508. The memory 508 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 502 may access the memory 508 for executable instructions and/or other information that may be used by the network device 500. The control circuit 502 may store the unique identifiers (e.g., serial numbers) of the control devices to which the network device 500 is associated in the memory 508. The control circuit 502 may access instructions in the memory 508 for executing the energy savings selector tool, or portions thereof. The control circuit 502 may store the load control information, electrical device information, and/or other information that may be used by the energy savings selector tool in the memory 508.

The network device 500 may comprise a communication circuit 504, which may be adapted to perform wired and/or wireless communications (e.g., with a system controller device 160 or another device over a network, such as the network 162 shown in FIG. 1) on behalf of the network device 500. The communication circuit 504 may be a wireless communication circuit, for example, including an RF transceiver coupled to an antenna 512 for transmitting and/or receiving RF signals (e.g., the RF signals 108 shown in FIG. 1). The communication circuit 504 may communicate using Wi-Fi, a proprietary protocol (e.g., the ClearConnect® protocol), Bluetooth®, and/or any other RF communications. The control circuit 502 may be coupled to the communication circuit 504 for transmitting digital messages via the RF signals 108, for example, to send and/or receive information regarding the electrical devices in the load control system 100. The control circuit 502 may be configured to receive digital messages, for example, from the system controller device 160 that may include information regarding the electrical devices in the load control system 100. The control circuit 502 may transmit digital messages via the communication circuit 504.

The network device 500 may comprise an actuator 506. The control circuit 502 may be responsive to the actuator 506 for receiving a user input. For example, the control circuit 502 may be operable to receive a button press from a user on the network device 500 for making a selection or performing other functionality on the network device 500.

The network device may comprise a display 510. The control circuit 502 may be in communication with a display 510 for displaying information to a user. The control circuit 502 may display information associated with the energy savings selector tool on the display 510. The communication between the display 510 and the control circuit 502 may be a two way communication, as the display 510 may include a touch screen module capable of receiving information from a user and providing such information to the control circuit 502.

The network device 500 may comprise a power supply 514 for generating a DC supply voltage $V_{CC}$ for powering the control circuit 502, the communication circuit 504, the memory 508, the display 510, and/or other circuitry of the network device 500. The power supply 514 may be a battery or another source of power for the network device 500.

Figure 6:
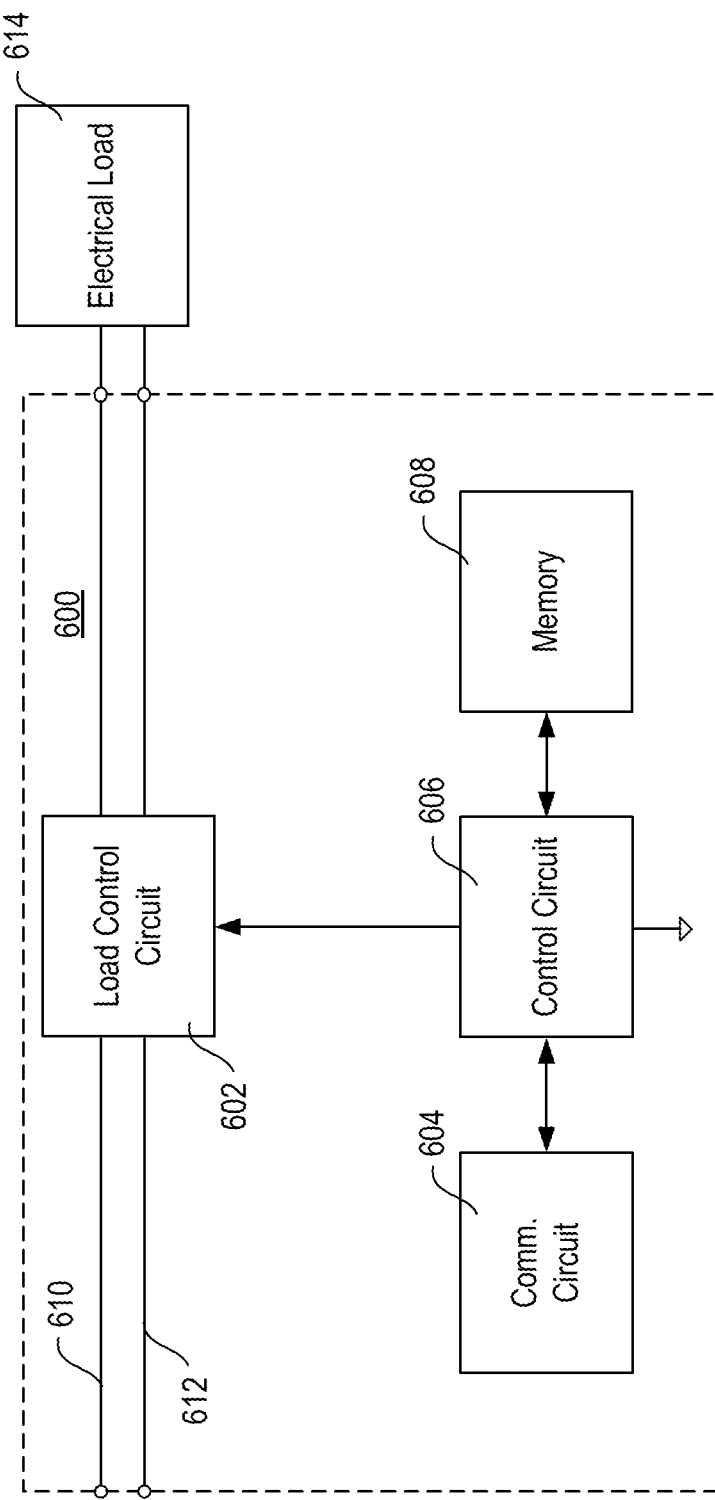
FIG. 6 is a block diagram depicting an example load control device.

FIG. 6 is a block diagram depicting an example load control device 600. As shown in FIG. 6, the load control device 600 may include a control circuit 606, which may include one or more of a processor (e.g., a microprocessor), a microcontroller, a programmable logic device (PLD), a field programmable gate array (FPGA), an application specific integrated circuit (ASIC), or any suitable processing device. The control circuit 606 may perform signal coding, data processing, power control, input/output processing, and/or any other functionality that enables the load control device 600 to perform as described herein.

The control circuit 606 may store information in and/or retrieve information from the memory 608. The memory 608 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 606 may access the memory 608 for executable instructions and/or other information that may be used by the load control device 600. The control circuit 606 may store the unique identifiers (e.g., serial numbers) of the control devices to which the load control device 600 is associated in the memory 608. The control circuit 606 may access instructions in the memory 608 for executing load control instructions and/or communications in the load control system.

The load control device 600 may comprise a communication circuit 604, which may be adapted to perform wired and/or wireless communications on behalf of the load control device 600. The communication circuit 604 may be a wireless communication circuit, for example, including an RF transceiver coupled to an antenna for transmitting and/or receiving RF signals (e.g., the RF signals 106 shown in FIG. 1). The communication circuit 604 may communicate using Wi-Fi, a proprietary protocol (e.g., the ClearConnect® protocol), Bluetooth®, and/or any other RF communications. The control circuit 606 may be coupled to the communication circuit 604 for transmitting and/or receiving digital messages via the RF signals 106.

The control circuit 606 may be in communication with a load control circuit 602 for controlling an electrical load 614. The load control circuit 602 may receive instructions from the control circuit 606 and may control the electrical load 614 (e.g., by controlling the amount of power provided to the load) based on the received instructions. The load control circuit 602 may receive power via a hot connection 610 and a neutral connection 612. While the load control device 600 includes four terminals as shown in FIG. 6, the load control device 600 may include one load terminal connected to the electrical load 614, which may be connected in series between the load control device 600 and a neutral of the AC power source supplying power to the hot connection 610 and the neutral connection 612. In other words, the load control device 600 may be a "three-wire" device. The load control device 600 may have one connection to the AC power source (e.g., hot connection 610) and may not comprise a connection to the neutral of the AC power source (e.g., may not comprise neutral connection 612). In other words, the load control device 600 may be a "two-wire" device. The electrical load 614 may include any type of electrical load (e.g., a lighting load, an electrical motor, a plug-in electrical load, etc.).

Although features and elements are described above in particular combinations, each feature or element can be used alone or in any combination with the other features and elements. The methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

Although features and elements have been described in relation to particular embodiments, many other variations, modifications, and other uses are apparent from the description provided herein. For example, while various types of hardware and/or software may be described for performing various features, other hardware and/or software modules may be implemented. The disclosure herein may not be limited by the examples provided.

The invention claimed is:

1. A non-transitory computer-readable storage medium having instructions stored thereon that, when executed by at least one processor, direct the at least one processor to:
    determine power usage information associated with a load control device providing power to an electrical load, wherein the electrical load is at least one of a heating, ventilation, and air conditioning (HVAC) system or a lighting system, and wherein the power usage information indicates at least one of an amount of energy consumed by the electrical load or an amount of time the electrical load is energized by the load control device;
    store the power usage information associated with the load control device;
    calculate an energy savings based on the stored power usage information associated with the load control device as compared to an amount of power consumed by the load control device when used with a motorized window treatment, an amount of power consumed by the load control device in an absence of a motorized window treatment, or an amount of power consumed by the load control device in response to a modified setting of an existing motorized window treatment; and
    transmit the power usage information and the energy savings to a network device configured to display the power usage information and the energy savings on a user interface at the network device.

2. The non-transitory computer-readable storage medium of claim 1, wherein the instructions further direct the at least one processor to:

access weather information associated with a location at which the load control device is installed; and determine, based on the weather information, at least one of an amount of sunlight, an amount of cloud cover, or an outside temperature at the location.

3. The non-transitory computer-readable storage medium of claim 1, wherein the load control device is a temperature control device, and wherein the power usage information relates to the heating, ventilation, and air conditioning (HVAC) system.

4. The non-transitory computer-readable storage medium of claim 3, wherein the energy savings further reflects a location at which the motorized window treatment is installed.

5. The non-transitory computer-readable storage medium of claim 4, wherein an amount of direct sunlight is determined for the location.

6. The non-transitory computer-readable storage medium of claim 1, wherein the energy savings is calculated with respect to a modified setting of the existing motorized window treatment, and wherein the modified setting indicates an amount to adjust a position of a covering material of the existing motorized window treatment.

7. The non-transitory computer-readable storage medium of claim 1, wherein the load control device is a plug-in load control device configured to be plugged in to an electrical receptacle, and wherein the power usage information relates to the lighting system.

8. The non-transitory computer-readable storage medium of claim 7, wherein the energy savings is calculated with respect to a modified setting of the existing motorized window treatment, and wherein the modified setting indicates an amount to adjust a position of a covering material of the existing motorized window treatment.

9. A method comprising:

configuring circuitry to determine power usage information associated with a load control device providing power to an electrical load, wherein the electrical load is at least one of a heating, ventilation, and air conditioning (HVAC) system, wherein the load control device is a temperature control device, or a lighting system, wherein the load control device is a lighting control device, and wherein the power usage information indicates at least one of an amount of energy consumed by the electrical load or an amount of time the electrical load is energized by the load control device;

determining the power usage information;

storing the power usage information associated with the load control device;

configuring circuitry to calculate an energy savings based on the stored power usage information associated with the load control device as compared to an amount of power consumed by the load control device when used with a motorized window treatment, an amount of power consumed by the load control device in an absence of a motorized window treatment, or an amount of power consumed by the load control device in response to a modified setting of an existing motorized window treatment;

calculating the energy savings; and transmitting the power usage information and the energy savings to a network device configured to display the power usage information and the energy savings on a user interface at the network device.

10. The method of claim 9, wherein the circuitry to calculate an energy savings is further configured to access weather information associated with a location at which the load control device is installed.

11. The method of claim 9, wherein the load control device is a temperature control device, and wherein the power usage information relates to the heating, ventilation, and air conditioning (HVAC) system.

12. The method of claim 11, wherein the energy savings is in response to a modified setting of the existing motorized window treatment, and wherein the modified setting indicates an amount to adjust a position of a covering material of the existing motorized window treatment.

13. The method of claim 11, wherein the circuitry to calculate an energy savings is further configured to calculate the energy savings using a location at which the motorized window treatment is installed.

14. The method of claim 13, wherein the circuitry to calculate an energy savings is further configured to calculate the energy savings based on at least one of weather information, an amount of sunlight, an amount of cloud cover, or an outside temperature at the location.

15. The method of claim 14, wherein, at a first time of a year, raising the covering material allows the temperature control device to provide power to the HVAC system less often due to heat from natural light.

16. The method of claim 9, wherein the load control device is a lighting control device, wherein the power usage information relates to the lighting system.

17. The method of claim 16, wherein the energy savings is in response to a modified setting of the existing motorized window treatment, and wherein the modified setting indicates an amount to adjust a position of a covering material of the existing motorized window treatment.

18. The method of claim 17, wherein the circuitry to calculate an energy savings is further configured to calculate the energy savings using a location at which the motorized window treatment is installed.

19. The method of claim 18, wherein the circuitry to calculate an energy savings is further configured to calculate the energy savings based on at least one of weather information, an amount of sunlight, an amount of cloud cover, or an outside temperature at the location.

20. The method of claim 19, wherein, at a first time of a day, raising the covering material allows the lighting control device to provide less power to the lighting system due to natural light.

21. The method of claim 18, wherein the circuitry to calculate an energy savings is further configured to calculate the energy savings based on a direct amount of sunlight at the location.

* * * * *